US008094282B1

(12) United States Patent
Kim et al.

(10) Patent No.: US 8,094,282 B1
(45) Date of Patent: Jan. 10, 2012

(54) METHOD OF FABRICATING A LIQUID CRYSTAL DISPLAY DEVICE HAVING IMAGE-DISPLAYING AND VIEWING ANGLE-ADJUSTING SUB PIXELS AND METHOD OF DRIVING THE SAME

(75) Inventors: Tae-Han Kim, Seoul (KR); In-Hyuk Song, Seoul (KR); Kyung-Eon Lee, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/226,214

(22) Filed: Sep. 6, 2011

Related U.S. Application Data

(62) Division of application No. 12/213,293, filed on Jun. 17, 2008, now Pat. No. 8,035,788.

(30) Foreign Application Priority Data

Jun. 5, 2008  (KR) ........................ 10-2008-0053237

(51) Int. Cl.
*G02F 1/1343*  (2006.01)
*G02F 1/1333*  (2006.01)
*G02F 1/13*  (2006.01)

(52) U.S. Cl. ............................ 349/144; 349/94; 349/187
(58) Field of Classification Search ................. 349/94, 349/96, 141, 144, 187
See application file for complete search history.

(56) References Cited

U.S. PATENT DOCUMENTS

| 2004/0095539 A1 | 5/2004 | Lee et al. |
| 2007/0076157 A1 | 4/2007 | Wang et al. |
| 2007/0121047 A1 | 5/2007 | Chung et al. |
| 2007/0153196 A1 | 7/2007 | Jang et al. |

*Primary Examiner* — Mark Robinson
*Assistant Examiner* — Paul Lee
(74) *Attorney, Agent, or Firm* — McKenna Long & Aldridge, LLP

(57) ABSTRACT

A liquid crystal display device includes: first and second substrates facing and spaced apart from each other, each of the first and second substrates having an image-displaying sub pixel and a viewing angle-adjusting sub pixel; a thin film transistor corresponding to each of the image-displaying sub pixel and the viewing angle-adjusting sub pixel; a liquid crystal display layer between the first and second substrates, the liquid crystal layer having a negative dielectric constant anisotropy; a first field distortion means in the image-displaying sub pixel; and a second field distortion means in the viewing angle-adjusting sub pixel.

11 Claims, 15 Drawing Sheets

METHOD OF FABRICATING A LIQUID CRYSTAL DISPLAY DEVICE HAVING IMAGE-DISPLAYING AND VIEWING ANGLE-ADJUSTING SUB PIXELS AND METHOD OF DRIVING THE SAME

CROSS-REFERENCE TO RELATED APPLICATIONS

This application is a Divisional of application Ser. No. 12/213,293 filed Jun. 17, 2008, now U.S. Pat. No. 8,035,788 now allowed, which claims priority to Korean Patent Application No. 10-20080053237, filed Jun. 5, 2008, all of which are incorporated by reference in their entirety for all purposes as if fully set forth herein.

TECHNICAL FIELD

The present application relates to a liquid crystal display device, and more particularly, to an in-cell type liquid crystal display device that is switchable in viewing angle and a method of driving the in-cell type liquid crystal display device.

BACKGROUND

A liquid crystal display (LCD) device includes two substrates facing and spaced apart from each other and a liquid crystal layer between the two substrates, and uses the optical anisotropy and polarization properties of liquid crystal molecules of the liquid crystal layer to produce an image. The liquid crystal molecules have long and thin shapes, and because of the optical anisotropy property, the polarization of light varies with the alignment direction of the liquid crystal molecules. Accordingly, the LCD device displays an image by controlling the alignment of the liquid crystal molecules as well as the transmittance of light through the liquid crystal layer due to adjustment of the electric field applied to the liquid crystal layer. Among the various types of LCD devices, active matrix LCD (AM-LCD) devices that employ switching elements and pixel electrodes arranged in a matrix structure are the subject of significant research and development because of their high resolution and superior suitability for displaying moving images.

According to the property of liquid crystal molecules, the forming method of liquid crystal layer and the driving method, the LCD devices may be classified into a twisted nematic (TN) mode, a super twisted nematic (TN) mode, an optically compensated birefringence (OCB) mode, an in-plane switching (IPS) mode and a vertical alignment (VA) mode. Specifically, the VA mode LCD device using negative type liquid crystal molecules having a negative dielectric constant anisotropy and a vertical alignment layer includes a liquid crystal layer where a longer axis of the liquid crystal molecules is aligned perpendicular to an alignment layer. The VA mode LCD device has advantages in contrast ratio and viewing angle.

Although an LCD device having a relatively wide viewing angle is generally preferable, an LCD device having a relatively narrow viewing angle is requested for privacy in a certain circumstance such as an automatic teller machine (ATM).

Recently, an LCD device which is driven switchably between a wide viewing angle mode and a narrow viewing angle mode has been researched and developed. FIG. 1 is a cross-sectional view of a liquid crystal display device switchable between a wide viewing angle mode and a narrow viewing angle mode according to the related art. In FIG. 1, an LCD device 10 includes first and second liquid crystal cells 20 and 40. The first liquid crystal cell 20 is used as a main cell displaying images corresponding to a data signal, and the second liquid crystal cell 40 is used as a switching cell changing a drive mode by controlling a viewing angle according to user's selection.

The first liquid crystal cell 20 includes first and second substrates 22 and 24 facing and spaced apart from each other, a first liquid crystal layer 26 between the first and second substrates 22 and 24, and first and second polarizing plates 28 and 30 on outer surfaces of the first and second substrates 22 and 24, respectively. The second liquid crystal cell 40 includes third and fourth substrates 42 and 44 facing and spaced apart from each other, a second liquid crystal layer 46 between the third and fourth substrates 42 and 44, and third and fourth polarizing plates 48 and 50 on outer surfaces of the third and fourth substrates 42 and 44, respectively. After the first and second liquid crystal cells 20 and 40 are separately formed, the LCD device 10 is completed by attaching the first and second liquid crystal cells 20 and 40.

The LCD device 10 is driven in one of a wide viewing angle mode and a narrow viewing angle mode according to user's selection. When the LCD device 10 is driven in the wide viewing angle mode, light along any viewing angle is transmitted through the second liquid crystal cell 40. As a result, a wide viewing angle image displayed by the first liquid crystal cell 20 is transmitted through the second liquid crystal cell 40 and the LCD device 10 displays the wide viewing angle image. When the LCD device 10 is driven in the narrow viewing angle, light along a front viewing angle is transmitted through the second liquid crystal cell 40 and the second liquid crystal cell displays a white text in a black background along a right-left viewing angle. Accordingly, a wide viewing angle image displayed by the first liquid crystal cell 20 is transmitted through the second liquid crystal cell 40 along the front viewing angle and is disturbed by the white text along the right-left viewing angle. As a result, the LCD device 10 displays a narrow viewing angle image.

However, since the LCD device 10 further includes additional elements such as the third and fourth substrates 42 and 44, the second liquid crystal layer 46 and the third and fourth polarizing plates 48 and 50 as compared with a conventional LCD device, the LCD device 10 is enlarged in weight and volume including thickness. In addition, since light from a backlight unit (not shown) of the LCD device 10 passes through the additional elements, brightness of the LCD device 10 is reduced. Furthermore, misalignment of the attachment of the first and second liquid crystal cells 20 and 40 causes deterioration of the LCD device 10, and apparatus and process for the conventional LCD device can not be adapted to the attachment step. Moreover, since the second liquid crystal cell 40 as a switching cell has a passive matrix type, the LCD device 10 can not be driven in various narrow viewing angle modes.

SUMMARY

Accordingly, the present invention is directed to a liquid crystal display device and a method of driving the liquid crystal display device that substantially obviates one or more of the problems due to limitations and disadvantages of the related art.

An object of the present invention is to provide an in-cell type liquid crystal display device which is driven switchably between a wide viewing angle mode and a narrow viewing angle mode without an additional switching cell and a method of driving the in-cell type liquid crystal display device.

A liquid crystal display device includes: first and second substrates facing and spaced apart from each other, each of the first and second substrates having an image-displaying sub pixel and a viewing angle-adjusting sub pixel; a thin film transistor corresponding to each of the image-displaying sub pixel and the viewing angle-adjusting sub pixel; a liquid crystal display layer between the first and second substrates, the liquid crystal layer having a negative dielectric constant anisotropy; a first field distortion means in the image-displaying sub pixel; and a second field distortion means in the viewing angle-adjusting sub pixel.

In another aspect, a method of fabricating a liquid crystal display device includes: forming a gate line and a data line on a first substrate, the gate line and the data line crossing each other to define an image-displaying sub pixel and a viewing angle-adjusting sub pixel; forming a thin film transistor connected to the gate line and the data line; forming a pixel electrode connected to the thin film transistor; forming a color filter layer in the image-displaying sub pixel on a second substrate; forming a common electrode on the color filter layer; forming a first field distortion means in the image-displaying sub pixel; forming a second field distortion means in the viewing angle-adjusting sub pixel; attaching the first and second substrates such that the pixel electrode and the common electrode face each other; and forming a liquid crystal layer having a negative dielectric constant anisotropy between the first and second substrates.

In another aspect, a method of driving a liquid crystal display device including: first and second substrates facing and spaced apart from each other, each of the first and second substrates having an image-displaying sub pixel and a viewing angle-adjusting sub pixel; a thin film transistor corresponding to each of the image-displaying sub pixel and the viewing angle-adjusting sub pixel; a liquid crystal display layer between the first and second substrates, the liquid crystal layer having a negative dielectric constant anisotropy; a first field distortion means in the image-displaying sub pixel; and a second field distortion means in the viewing angle-adjusting sub pixel includes: when the liquid crystal display device is operated in a wide viewing angle mode, displaying a first image of a wide viewing angle by the image-displaying sub pixel; and displaying a black at an entire viewing angle range by the viewing angle-adjusting sub pixel, when the liquid crystal display device is operated in a narrow viewing angle mode, displaying the first image of the wide viewing angle by the image-displaying sub pixel; and displaying the black within a front viewing angle range and a second image within a predetermined viewing angle range by the viewing angle-adjusting sub pixel.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE PREFERRED EMBODIMENTS

Reference will now be made in detail to embodiments which are illustrated in the accompanying drawings. Wherever possible, similar reference numbers will be used to refer to the same or similar parts.

Figure 1:
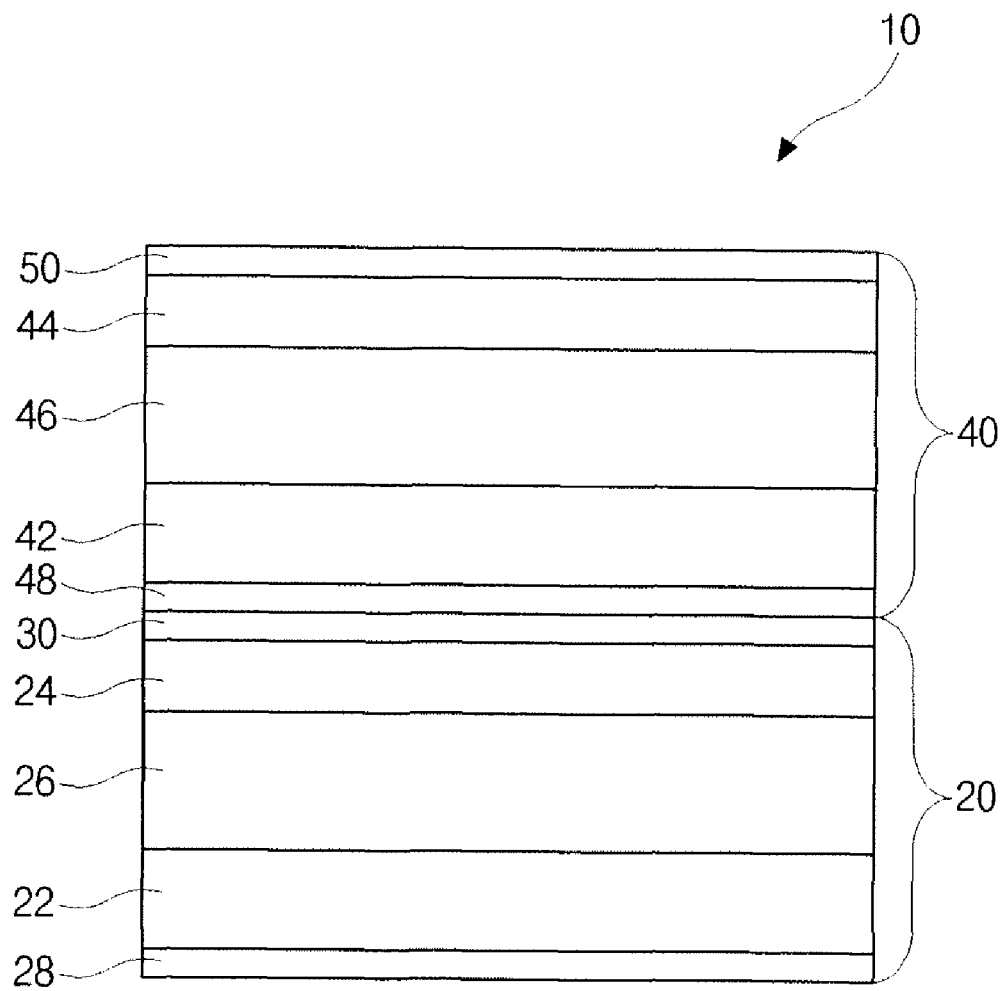
FIG. 1 is a cross-sectional view of a liquid crystal display device switchable between a wide viewing angle mode and a narrow viewing angle mode according to the related art.
Figure 2:
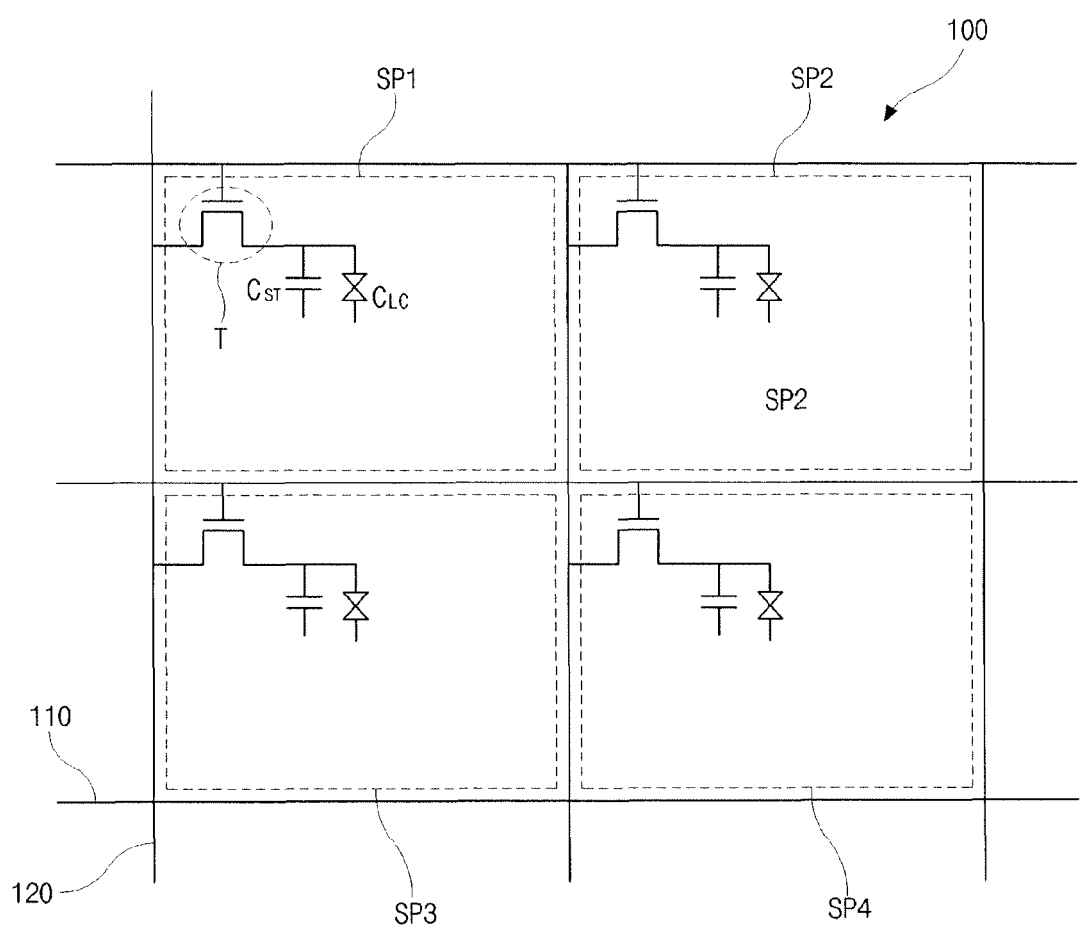
FIG. 2 is a view showing a pixel of a liquid crystal display device according to a first embodiment of the present invention.

FIG. 2 is a view showing a pixel of a liquid crystal display device according to a first embodiment of the present invention.

In FIG. 2, a liquid crystal display device 100 includes a plurality of gate lines 110, a plurality of data lines 120, a plurality of thin film transistors (TFTs) T, a plurality of storage capacitors $C_{ST}$ and a plurality of liquid crystal capacitor $C_{LC}$. The plurality of data lines 120 cross the plurality of gate lines 110 to define first, second, third and fourth sub pixels SP1, SP2, SP3 and SP4 constituting a unit pixel for a color image. The TFT T is connected to the gate line 110 and the data line 120 to correspond to the sub pixel. The storage capacitor $C_{ST}$ and the liquid crystal capacitor $C_{LC}$ are connected to the TFT T, and a data signal is applied to the storage capacitor $C_{ST}$ and the liquid crystal capacitor $C_{LC}$ through the TFT T.

For example, the first, second and third sub pixels SP1, SP2 and SP3 are image-displaying sub pixels displaying red, green and blue colors, respectively, and each has a wide viewing angle property such that a transmittance has a relatively high value at a wide viewing angle range. In addition, the fourth sub pixel SP4 is a viewing angle-adjusting sub pixel displaying a white color and a transmittance of the fourth sub pixel SP4 has a relatively high value at a predetermined viewing angle. Each of the first, second, third and fourth sub pixels SP1, SP2, SP3 and SP4 is connected to the respective TFT T and driven by the respective data signal.

Figure 3A:
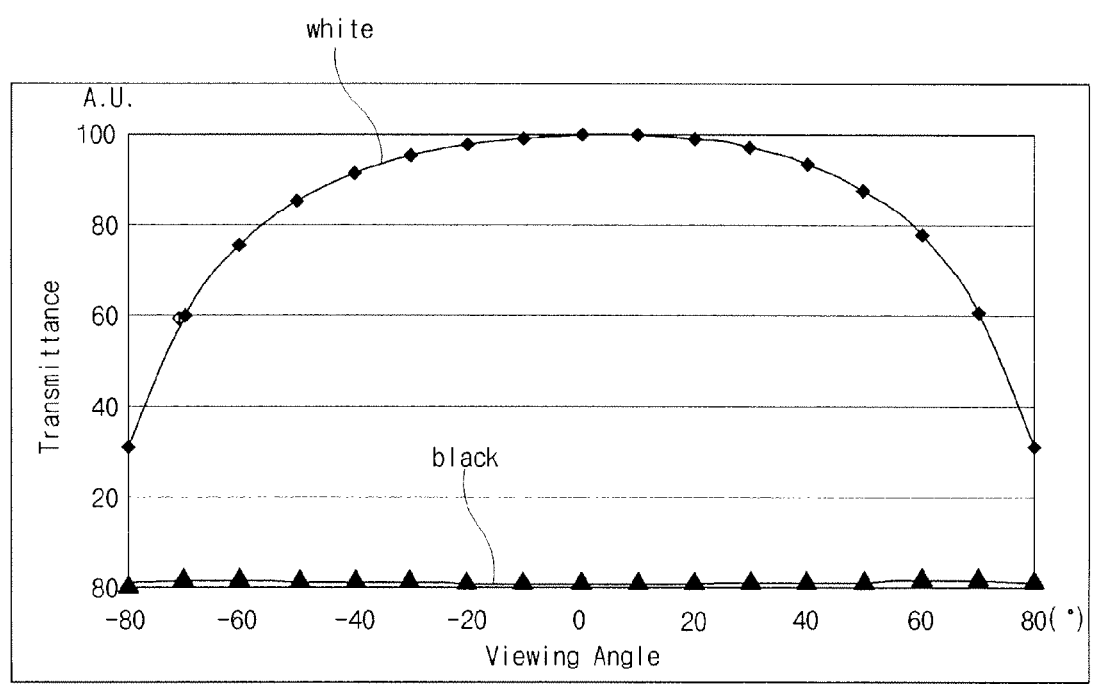
FIGS. 3A and 3B are graphs showing transmittance properties of an image-displaying sub pixel and a viewing angle-adjusting sub pixel, respectively, of a liquid crystal display device according to a first embodiment of the present invention.
Figure 3B:
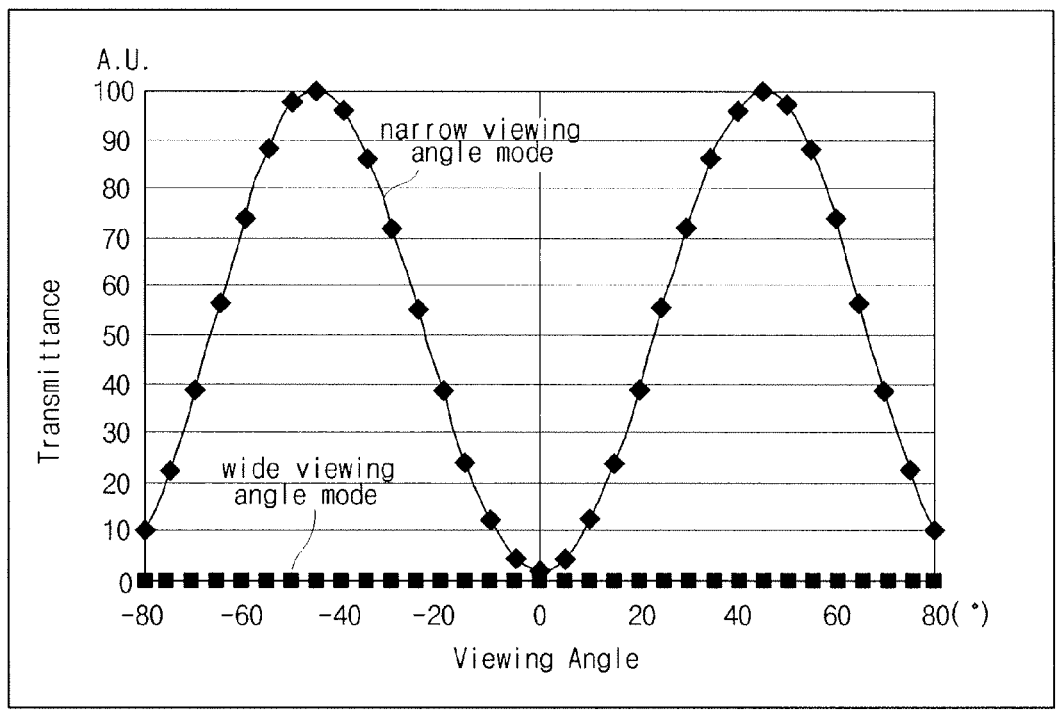

FIGS. 3A and 3B are graphs showing transmittance properties of an image-displaying sub pixel and a viewing angle-adjusting sub pixel, respectively, of a liquid crystal display device according to a first embodiment of the present invention. X-axes of the graphs represent a right-left viewing angle or an up-down viewing angle, and y-axes of the graphs represent a relative transmittance of arbitrary unit (A.U.).

In FIG. 3A, the image-displaying sub pixel such as the first, second and third sub pixels SP1, SP2 and SP3 (of FIG. 2) has the transmittance corresponding to the respective data signal. When a maximum value or a minimum value of the data signal is applied to the liquid crystal capacitor $C_{LC}$ (of FIG. 2) of the image-displaying sub pixel, a white or a black is displayed at substantially entire viewing angle range by the image-displaying sub-pixel. The white and the black represent a high value and a low value, respectively, in transmittance. Accordingly, the white becomes red, green and blue colors through a color filter layer (not shown) in the first, second and third sub pixels SP1, SP2 and SP3, respectively.

When a voltage is applied to the first, second and third sub pixels SP1, SP2 and SP3 in a normally black type, the transmittance of each of the first, second and third sub pixels SP1, SP2 and SP3 is about 100 at a front viewing angle and is over about 30 at a right-left viewing angle or an up-down viewing angle of about −80° to about +80° (the transmittance is over about 60 at a right-left viewing angle or an up-down viewing angle of about −70° to about +70° and is over about 85 at a right-left viewing angle or an up-down viewing angle of about −50° to about)+50°. Accordingly, the image-displaying sub pixel such as the first, second and third sub pixels SP1, SP2 and SP3 has a property graph of a transmittance to a viewing angle where the transmittance has a maximum value at the front viewing angle (a viewing angle of about 0°) and decreases with increase of the right-left viewing angle or the up-down viewing angle. In addition, the image-displaying sub pixel has the transmittance over about 30 within a range of a predetermined right-left viewing angle or a predetermined up-down viewing angle, for example, a range of about −80° to about +80°.

When a voltage is not applied to the first, second and third sub pixels SP1, SP2 and SP3 in a normally black type, the transmittance of each of the first, second and third sub pixels SP1, SP2 and SP3 is less than about 1 at a right-left viewing angle and an up-down viewing angle of about −80° to about +80°. The image-displaying sub pixel in a normally white type has a similar property of the transmittance to the viewing angle with the image-displaying sub pixel in a normally black type except opposite display of the white and the black according to application of voltage.

As a result, the image-displaying sub pixel such as the first, second and third sub pixels SP1, SP2 and SP3 has a wide viewing angle property regardless of an operation mode of the LCD device such that an image is displayed with a relatively high contrast ratio at a right-left viewing angle or an up-down viewing angle of about −80° to about +80°.

In FIG. 3B, the viewing angle-adjusting sub pixel such as the fourth sub pixel SP4 (of FIG. 2) has the transmittance of about 0 within an entire viewing angle range or the maximum transmittance at a predetermined viewing angle according to an operation mode (one of a wide viewing angle mode and a narrow viewing angle mode) of the LCD device by user's selection. For example, when a voltage is applied to fourth sub pixels SP4 in a normally black type, the transmittance of the fourth sub pixels SP4 is about 0 at a front viewing angle (viewing angle of about 0°) and is about 100 at a right-left viewing angle or an up-down viewing angle of about −45° and about +45°. Further, the transmittance of the fourth sub pixel SP4 is over about 30 at a right-left viewing angle or an up-down viewing angle of about −70° to about −20° and of about +20° to about 70° (the transmittance is over about 60 at a right-left viewing angle or an up-down viewing angle of about −65° to about −25° and of about +25° to about 65° and is over about 85 at a right-left viewing angle or an up-down viewing angle of about −55° to about −35° and of about +35° to about 35°). Accordingly, the viewing angle-adjusting sub pixel such as the fourth sub pixel SP4 has a property graph of a transmittance to a viewing angle where the transmittance has a minimum value (for example, about 0) at the front viewing angle (a viewing angle of about 0°) and maximum values at predetermined right-left viewing angles or predetermined up-down viewing angles, for example, about −45° and about +45°, and is between the maximum value and the minimum value at the other viewing angles. As a result, the property graph has a shape of a degree-4 curve. The predetermined right-left viewing angles or predetermined up-down viewing angles may be substantially symmetrical to each other with respect to the front viewing angle. Specifically, the viewing angle-adjusting sub pixel has the transmittance over about 30 within a range of a predetermined right-left viewing angle or a predetermined up-down viewing angle, for example, a range of about −70° to about −20° and about +20° to about +70°.

When a voltage is not applied to the fourth sub pixel SP4 in a normally black type, the transmittance of the fourth sub pixel SP4 is substantially about 0 at a right-left viewing angle or an up-down viewing angle of about −80° to about +80°. The viewing angle-adjusting sub pixel in a normally white type has a similar property of the transmittance to the viewing angle with the viewing angle-adjusting sub pixel in a normally black type except opposite display of the white and the black according to application of voltage.

The LCD device may be operated in one of a wide viewing angle mode and a narrow viewing angle mode according to voltage application by user's selection. In the wide viewing angle mode, the viewing angle-adjusting sub pixel such as the fourth sub pixel SP4 displays the black within an entire viewing angle range. Accordingly, the wide viewing angle image of the first, second and third sub pixels SP1, SP2 and SP3 is not disturbed by the black and the LCD device displays the wide viewing angle image. In the narrow viewing angle mode, the viewing angle-adjusting sub pixel such as the fourth sub pixel SP4 displays the white within a predetermined viewing angle range. Accordingly, the wide viewing angle image of the first, second and third sub pixels SP1, SP2 and SP3 is disturbed by the white at the predetermined viewing angle range and the LCD device does not display the wide viewing angle image at the predetermined viewing angle range due to reduction of contrast ratio. As a result, the LCD device displays a narrow viewing angle image. The predetermined viewing angle range may be determined by a structure of the viewing angle-adjusting sub pixel or an applied voltage. Therefore, the operation mode of the LCD device may be switched between the wide viewing angle mode and the narrow viewing angle mode by the voltage application to the viewing angle-adjusting sub pixel.

Figure 4A:
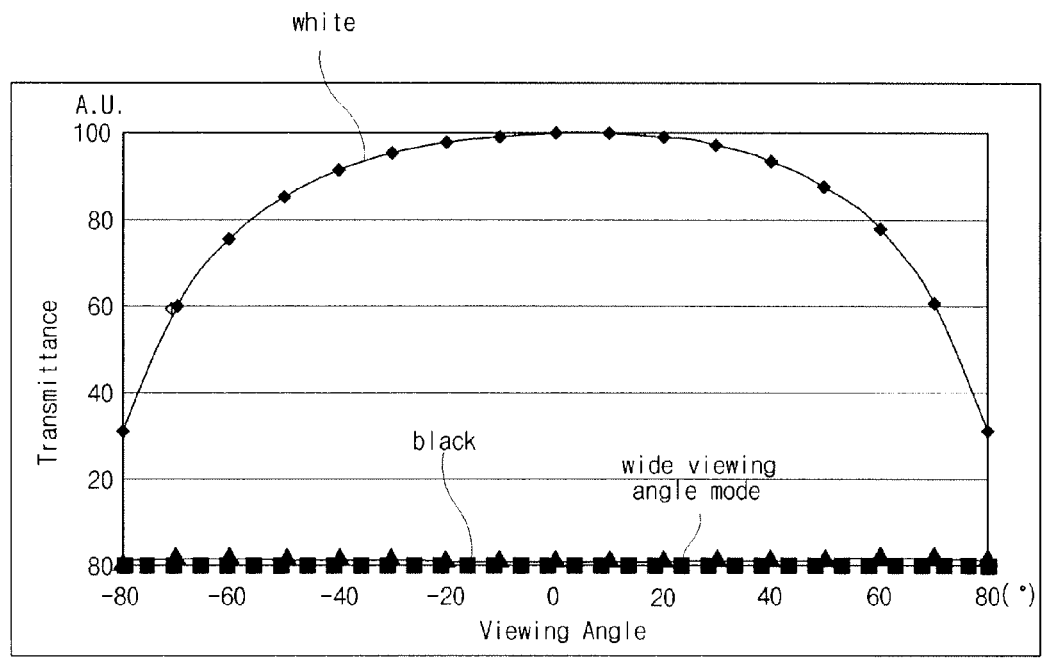
FIG. 4A is a graph showing transmittance property of a image-displaying sub pixel and a viewing angle-adjusting sub pixel of a liquid crystal display device in a wide viewing angle mode according to a first embodiment of the present invention.
Figure 4B:
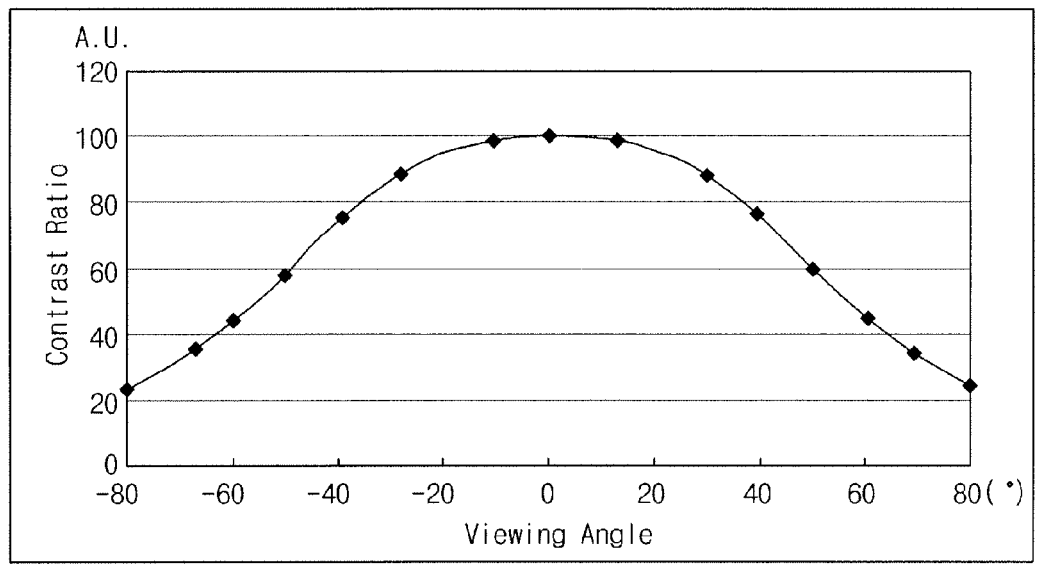
FIG. 4B is a graph showing contrast ratio property of a liquid crystal display device in a wide viewing angle according to a first embodiment of the present invention.

FIG. 4A is a graph showing transmittance property of a image-displaying sub pixel and a viewing angle-adjusting sub pixel of a liquid crystal display device in a wide viewing angle mode according to a first embodiment of the present invention and FIG. 4B is a graph showing contrast ratio property of a liquid crystal display device in a wide viewing angle according to a first embodiment of the present invention. X-axes of the graphs represent a right-left viewing angle or an up-down viewing angle, and y-axes of the graphs represents a relative transmittance of arbitrary unit (A.U.) and a relative contrast ratio of arbitrary unit (A.U.).

In FIG. 4A, when the LCD device is operated in the wide viewing angle mode, the image-displaying sub pixel such as the first, second and third sub pixels SP1, SP2 and SP3 (of FIG. 2) has transmittances corresponding to the data signal, for example, the white or the black. The viewing angle-adjusting sub pixel such as the fourth sub pixel SP4 (of FIG. 2) has the transmittance of about 0 within an entire viewing angle range. The white of the LCD device corresponds to the sum of the transmittance of the white of the image-displaying sub pixel and the transmittance of the viewing angle-adjusting sub pixel in the wide viewing angle mode, and the black of the LCD device corresponds to the sum of the transmittance of the black of the image-displaying sub pixel and the transmittance of the viewing angle-adjusting sub pixel in the wide viewing angle mode. Since the transmittance of the viewing angle-adjusting sub pixel in the wide viewing angle mode is substantially about 0 within an entire viewing angle range, the white and the black of the LCD device are substantially the same as the white and the black of the image-displaying sub pixel, respectively.

As shown in FIG. 4B, the contrast ratio defined by a ratio of the white to the black of the LCD device is over about 20 at a right-left viewing angle or an up-down viewing angle of about −80° to about +80° (the contrast ratio is over about 30 at a right-left viewing angle or an up-down viewing angle of about −70° to about +70° and is over about 60 at a right-left viewing angle or an up-down viewing angle of about −50° to about)+50°. Accordingly, the LCD device displays images with a relatively high contrast ratio within a substantially entire viewing angle range in the wide viewing angle mode.

Figure 5A:
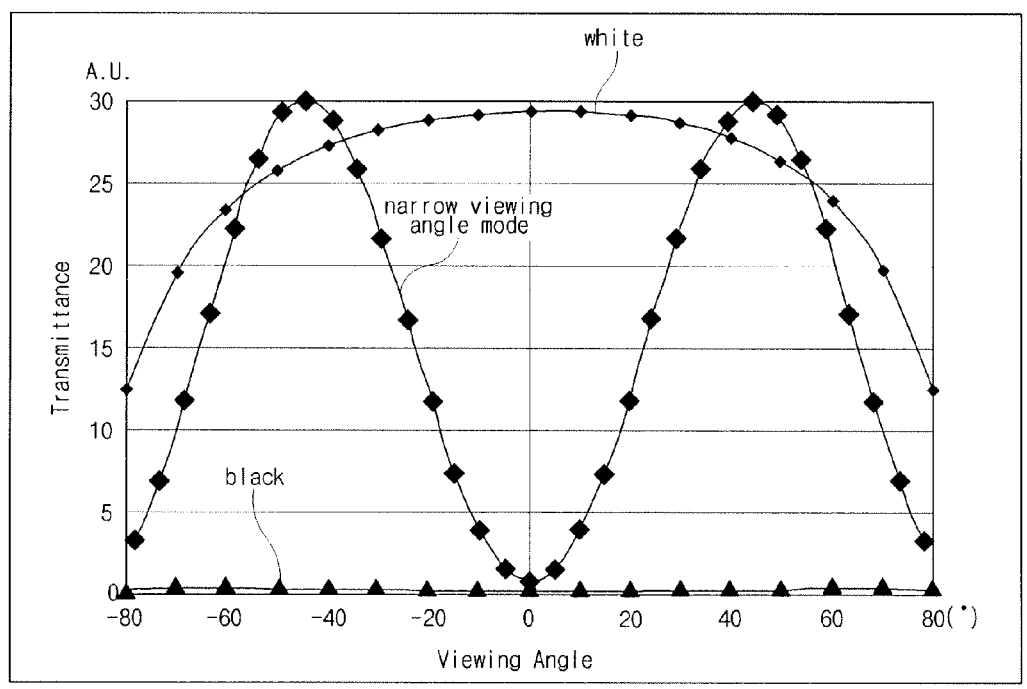
FIG. 5A is a graph showing transmittance property of a image-displaying sub pixel and a viewing angle-adjusting sub pixel of a liquid crystal display device in a narrow viewing angle mode according to a first embodiment of the present invention.
Figures 5B, 6:
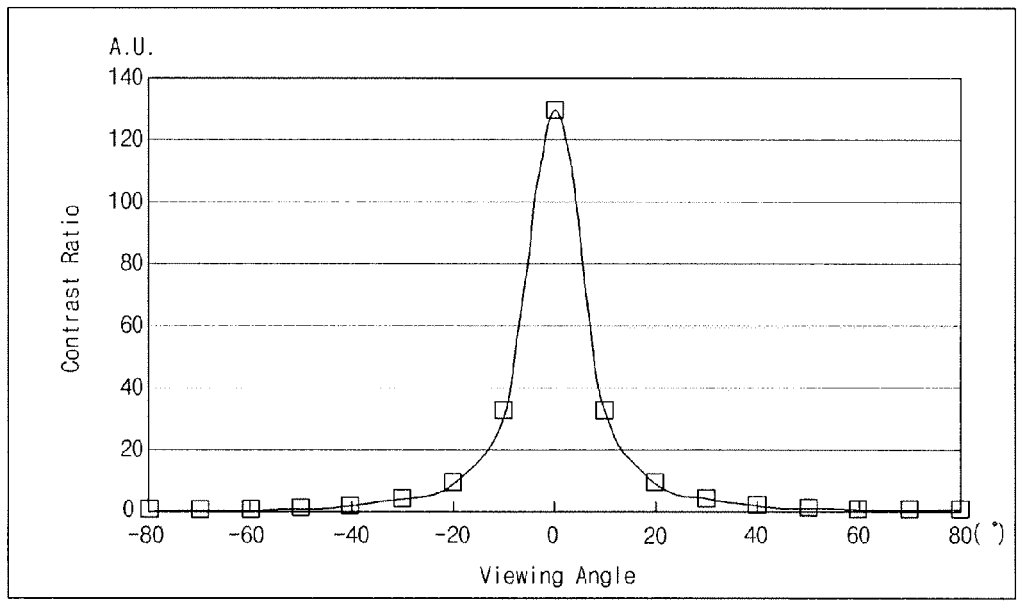
FIG. 5B is a graph showing contrast ratio property of a liquid crystal display device in a narrow viewing angle according to a first embodiment of the present invention.
FIG. 6 is a view showing images displayed by a liquid crystal display device in a narrow viewing angle mode according to a first embodiment of the present invention.

FIG. 5A is a graph showing transmittance property of a image-displaying sub pixel and a viewing angle-adjusting sub pixel of a liquid crystal display device in a narrow viewing angle mode according to a first embodiment of the present invention and FIG. 5B is a graph showing contrast ratio property of a liquid crystal display device in a narrow viewing angle according to a first embodiment of the present invention. X-axes of the graphs represent a right-left viewing angle or an up-down viewing angle, and y-axes of the graphs represents a relative transmittance of arbitrary unit (A.U.) and a relative contrast ratio of arbitrary unit (A.U.).

In FIG. 5A, when the LCD device is operated in the narrow viewing angle mode, the image-displaying sub pixel such as the first, second and third sub pixels SP1, SP2 and SP3 (of FIG. 2) has transmittances corresponding to the data signal, for example, the white or the black. The viewing angle-adjusting sub pixel such as the fourth sub pixel SP4 (of FIG. 2) has the maximum transmittance within a predetermined viewing angle range. The white of the LCD device corresponds to the sum of the transmittance of the white of the image-displaying sub pixel and the transmittance of the viewing angle-adjusting sub pixel in the narrow viewing angle mode, and the black of the LCD device corresponds to the sum of the transmittance of the black of the image-displaying sub pixel and the transmittance of the viewing angle-adjusting sub pixel in the narrow viewing angle mode. Accordingly, the white of the LCD device is substantially the same as the white of the image-displaying sub pixel, and the black of the LCD device is substantially the same as the transmittance of the image-displaying sub pixel in the narrow viewing angle mode.

As shown in FIG. 5B, the contrast ratio of the LCD device has a maximum value of about 130 at the front viewing angle (a viewing angle of about 0°). In addition, the contrast ratio of the LCD device is over about 10 at a right-left viewing angle or an up-down viewing angle of about −20° to about +20°, which may be referred to as a front viewing angle range (the contrast ratio is over about 30 at a right-left viewing angle or an up-down viewing angle of about −10° to about)+10°, and is substantially about 0 at a right-left viewing angle or an up-down viewing angle smaller than about −20° and greater than about +20°. Accordingly, the LCD device displays images with a relatively high contrast ratio within the front viewing angle range, and displays images with a relatively low contrast ratio within the predetermined viewing angle range (for example, smaller than about −20° and greater than about)+20°. As a result, a user located within the predetermined viewing angle range does not recognize the images, thereby the LCD device displaying the images only within the front viewing angle range in the narrow viewing angle mode.

FIG. 6 is a view showing images displayed by a liquid crystal display device in a narrow viewing angle mode according to a first embodiment of the present invention.

In the LCD device according to the first embodiment of the present invention, first, second, third and fourth data signals are applied to first, second, third and fourth sub pixels SP1, SP2, SP3 and SP4 (of FIG. 2), respectively. When the LCD device is operated in the wide viewing angle mode, the image-displaying sub pixels such as the first, second and third sub pixels SP1, SP2 and SP3 display a first image of a wide viewing angle, and the viewing angle-adjusting sub pixel such as the fourth sub pixel SP4 displays the black within an entire viewing angle range. As a result, the LCD device displays the first image with a wide viewing angle.

As shown in FIG. 6, when the LCD device is operated in the narrow viewing angle, the image-displaying sub pixels such as the first, second and third sub pixels SP1, SP2 and SP3 display the first image of the wide viewing angle, and the viewing angle-adjusting sub pixel such as the fourth sub pixel SP4 displays the black within a front viewing angle range and a second image of single color of white within a predetermined viewing angle range. Since the first image is not recognized within the predetermined viewing angle range due to reduction in contrast ratio by disturbance of the second image, the LCD device displays the first image within the front viewing angle range, i.e., with a narrow viewing angle. The fourth data signals applied to the fourth sub pixels SP4 of the LCD device may have an equal voltage such that the second image corresponds to the white of uniform brightness.

Figure 7:
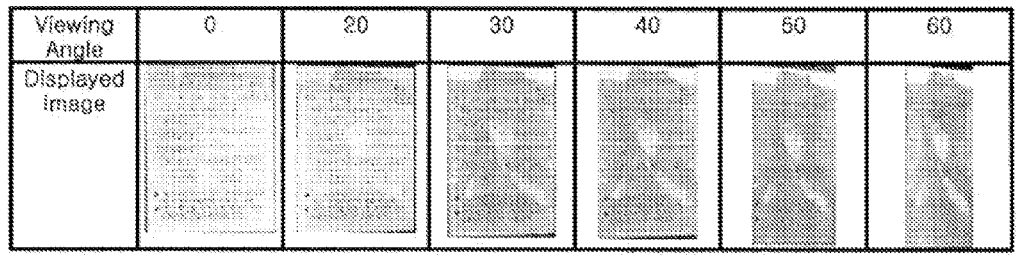
FIG. 7 is a view showing images displayed by a liquid crystal display device in a narrow viewing angle mode according to a second embodiment of the present invention.
Figure 8:
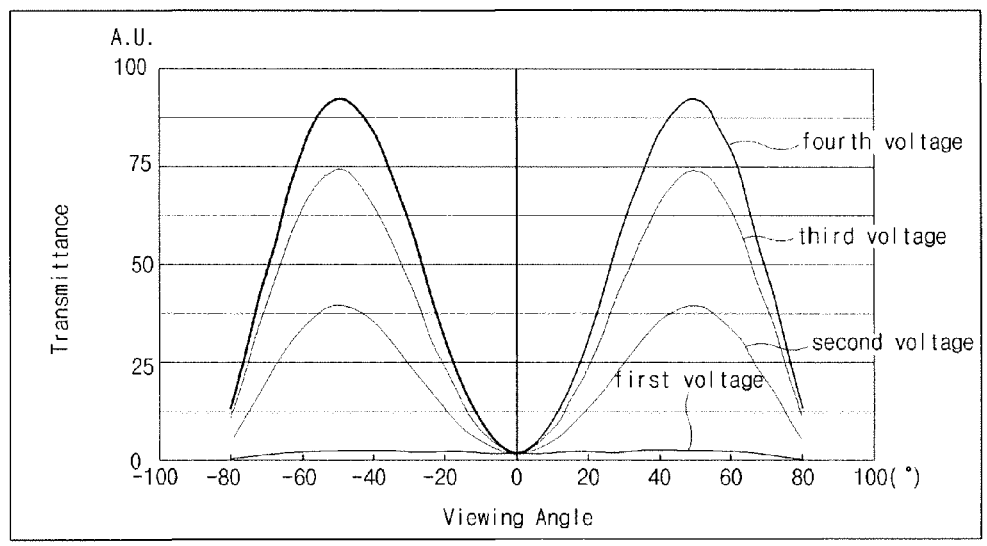
FIG. 8 is a graph showing transmittance property of a viewing angle-adjusting sub pixel of a liquid crystal display device according to a second embodiment of the present invention.

FIG. 7 is a view showing images displayed by a liquid crystal display device in a narrow viewing angle mode according to a second embodiment of the present invention, and FIG. 8 is a graph showing transmittance property of a viewing angle-adjusting sub pixel of a liquid crystal display device according to a second embodiment of the present invention.

In the LCD device according to the second embodiment of the present invention, first, second, third and fourth data signals are applied to first, second, third and fourth sub pixels SP1, SP2, SP3 and SP4 (of FIG. 2), respectively. The operation of the LCD device of the second embodiment in a wide viewing angle mode is substantially the same as the operation of the LCD device of the first embodiment in a wide viewing angle mode. Accordingly, when the LCD device is operated in the wide viewing angle mode, the image-displaying sub pixels such as the first, second and third sub pixels SP1, SP2 and SP3 display a first image of a wide viewing angle, and the viewing angle-adjusting sub pixel such as the fourth sub pixel SP4 displays the black within an entire viewing angle range. As a result, the LCD device displays the first image with a wide viewing angle.

As shown in FIG. 7, when the LCD device is operated in the narrow viewing angle, the image-displaying sub pixels such as the first, second and third sub pixels SP1, SP2 and SP3 display the first image of the wide viewing angle, and the viewing angle-adjusting sub pixel such as the fourth sub pixel SP4 displays the black within a front viewing angle range and a second image (e.g., characters or text) different from the first image within a predetermined viewing angle range. Accordingly, the first, second and third data signals corresponding to the first image are applied to the first, second and third sub pixels SP1, SP2 and SP3, respectively, and the fourth data signal corresponding to the second image is applied to the fourth sub pixel SP4. Since the first image is not recognized within the predetermined viewing angle range due to reduction in contrast ratio by disturbance of the second image, the LCD device displays the first image within the front viewing angle range, i.e., with a narrow viewing angle.

The fourth data signals respectively applied to the fourth sub pixels SP4 of the LCD device through TFTs may have various voltages such that the second image has a shape such as characters or a text by differences in grays. As shown in FIG. 8, when first, second, third and fourth voltages different from each other are applied to the fourth sub pixels SP4 of the LCD device, the fourth sub pixels SP4 display a black of transmittance of about 0 within the front viewing angle range and four grays corresponding to transmittances of about 0, about 40, about 80 and about 100 within the predetermined viewing angle range (e.g., at the viewing angle of about −45° and about +45)°. Accordingly, the LCD device displays the second images having differences in grays within the predetermined viewing angle range.

Figure 9:
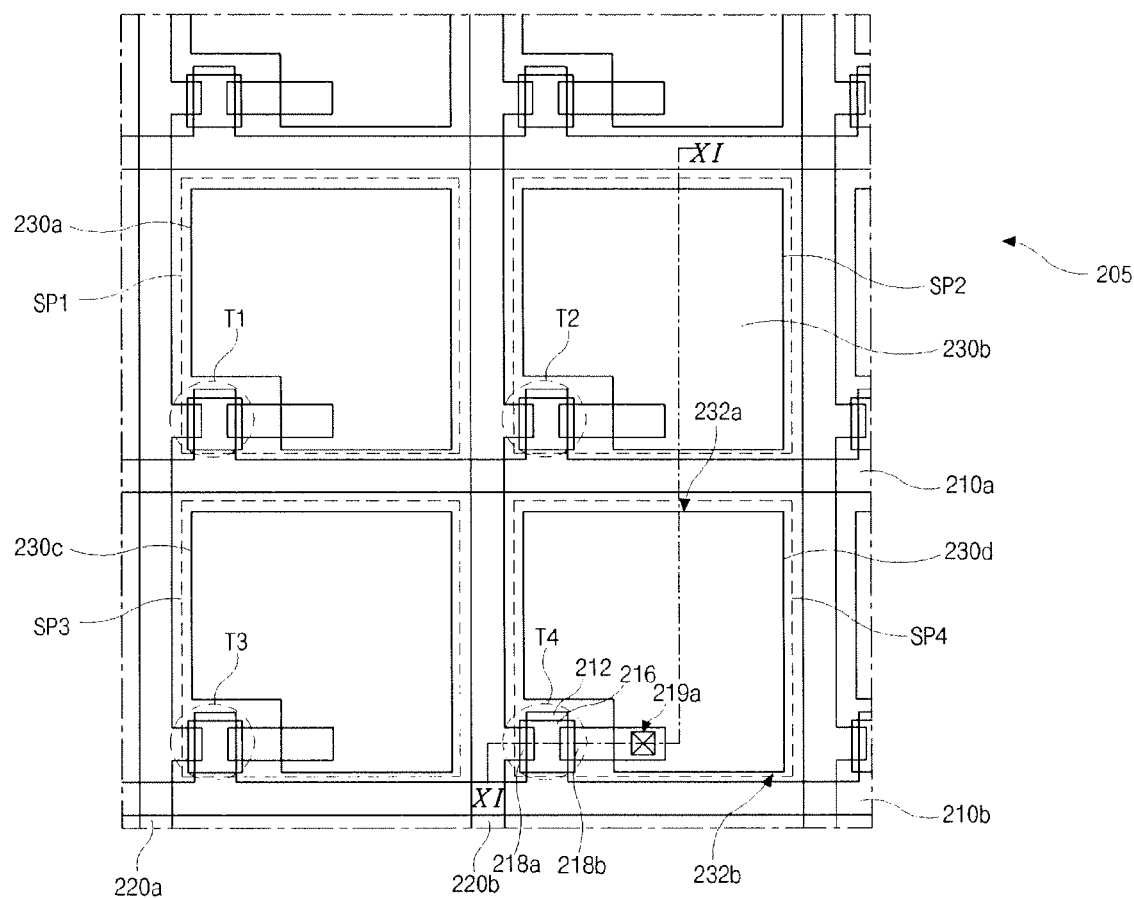
FIGS. 9 and 10 are plan views showing an array substrate and a color filter substrate, respectively, of a liquid crystal display device according to a third embodiment of the present invention.
Figure 10:
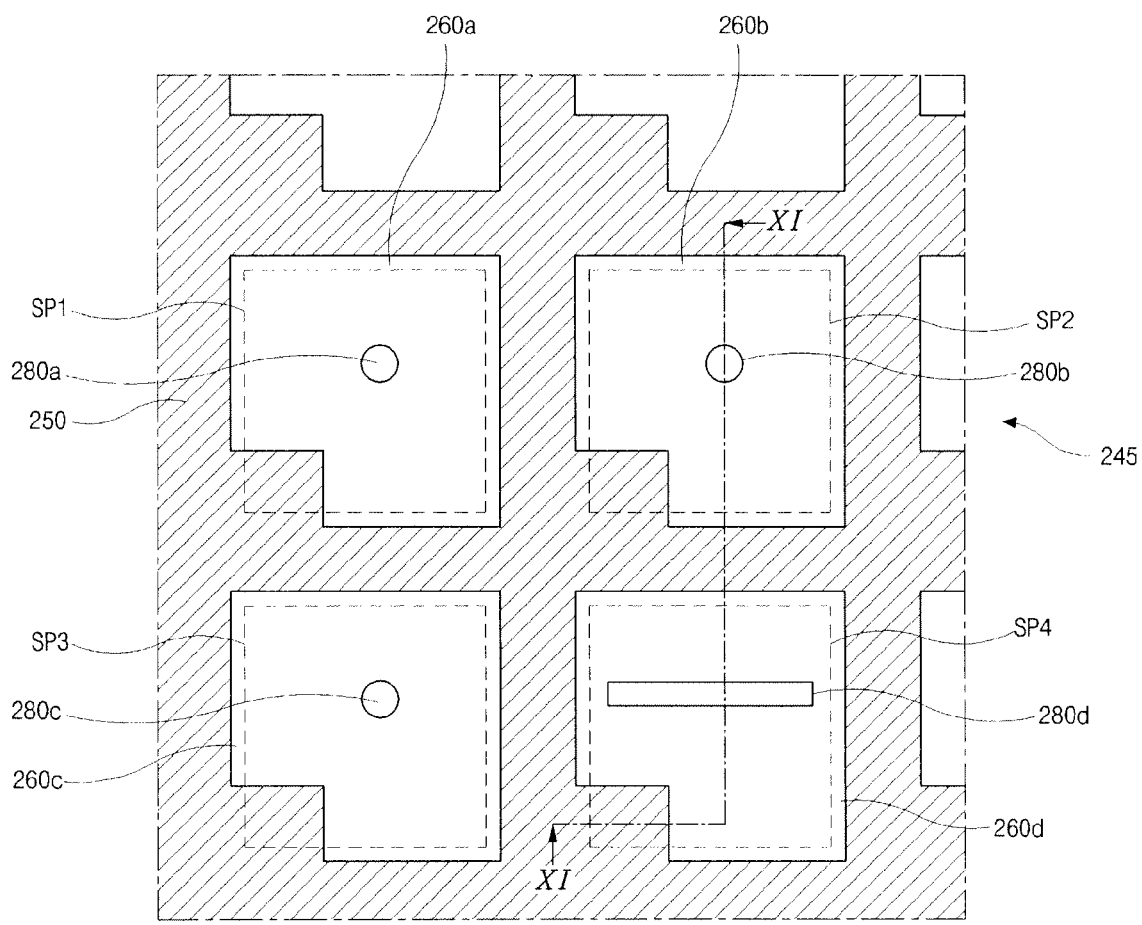

FIGS. 9 and 10 are plan views showing an array substrate and a color filter substrate, respectively, of a liquid crystal display device according to a third embodiment of the present invention. In addition, FIG. 11 is a cross-sectional view, which is taken along a line XI-XI of FIGS. 9 and 10, showing a liquid crystal display device according to a third embodiment of the present invention.

Figure 11:
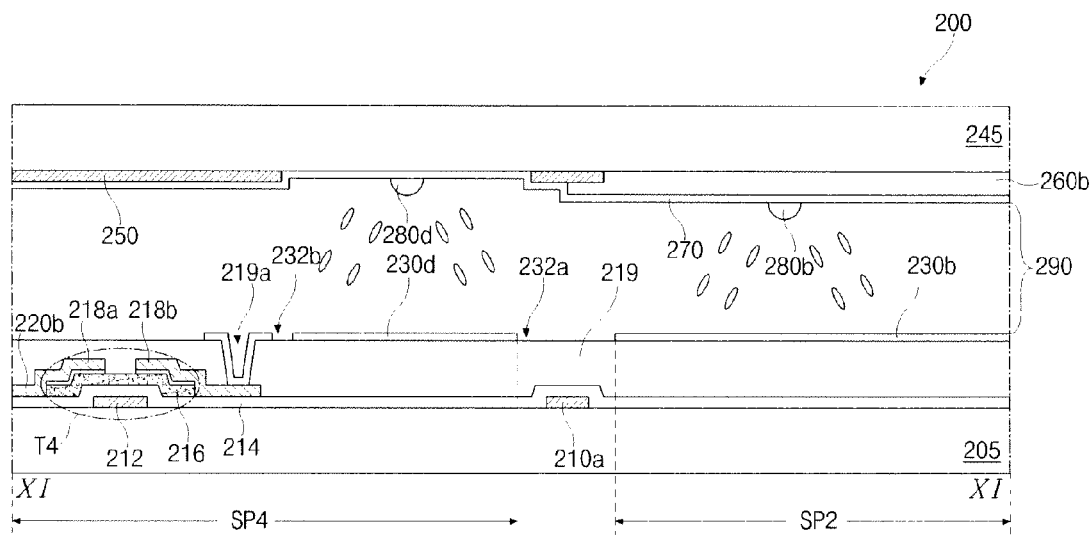
FIG. 11 is a cross-sectional view, which is taken along a line XI-XI of FIGS. 9 and 10, showing a liquid crystal display device according to a third embodiment of the present invention.

In FIGS. 9 and 11, an LCD device 200 includes first and second substrates 205 and 245 facing and spaced apart from each other. The first substrate 205 includes first, second, third and fourth sub pixels SP1, SP2, SP3 and SP4. A first gate line 210a, a second gate line 210b and a gate electrode 212 are formed on the first substrate 205. Although the gate electrode 212 is connected to the second gate line 210b in the fourth sub pixel SP4 in FIG. 11, each of the first, second and third sub pixels SP1, SP2 and SP3 includes the gate electrode. A gate insulating layer of one of inorganic and organic insulating materials is formed on the first gate line 210a, the second gate line 210b and the gate electrode 212, and an active layer 216 of a semiconductor material such as amorphous silicon (a-Si:H) is formed on the gate insulating layer 214 over the gate electrode 212. Although not shown in FIG. 11, each of the first, second and third sub pixels SP1, SP2 and SP3 includes the active layer. Source and drain electrodes 218a and 218b of a conductive material are formed on the active layer 216 to be spaced apart from each other. The gate electrode 212, the active layer 216, the source electrode 218a and the drain electrode 218b constitute a fourth thin film transistor (TFT) T4. In addition, the first, second and third sub pixels SP1, SP2 and SP3 include the first, second and third TFTs, respectively.

First and second data lines 220a and 220b crossing the first and second gate lines 210a and 210b to define the first, second, third and fourth sub pixels SP1, SP2, SP3 and SP4 are formed on the gate insulating layer 214. The source electrode 218a is connected to the second data line 221b. A passivation layer 219 of one of inorganic and organic insulating materials is formed on the first data line 220a, the second data line 220b, the source electrode 218a and the drain electrode 218b. The passivation layer 219 has a drain contact hole 219a exposing the drain electrode 218b. First, second, third and fourth pixel electrodes 230a, 230b, 230c and 230d of a transparent conductive material are formed on the passivation layer 219 in the first, second, third and fourth sub pixels SP1, SP2, SP3 and SP4, respectively. Each of the first, second, third and fourth pixel electrodes 230a, 230b, 230c and 230d is connected to the corresponding drain electrode in each of the first, second, third and fourth sub pixels SP1, SP2, SP3 and SP4. For example, the fourth pixel electrode 230d is connected to the drain electrode 218b through the drain contact hole 219a in the fourth sub pixel SP4.

The first pixel electrode 230a connected to the first TFT T1 is formed in the first sub pixel SP1 defined by the first gate line 210a and the first data line 220a, and a first data signal is applied to the first pixel electrode 230a. Similarly, the second pixel electrode 230b connected to the second TFT T2 is formed in the second sub pixel SP2 defined by the first gate line 210a and the second data line 220b, and a second data signal is applied to the second pixel electrode 230b. In addition, the third pixel electrode 230c connected to the third TFT T3 is formed in the third sub pixel SP3 defined by the second gate line 210b and the first data line 220a, and a third data signal is applied to the third pixel electrode 230c. Finally, the fourth pixel electrode 230d connected to the fourth TFT T4 is formed in the fourth sub pixel SP4 defined by the second gate line 210b and the second data line 220b, and a fourth data signal is applied to the fourth pixel electrode 230d.

Here, the first, second, third and fourth pixel electrodes 230a, 230b, 230c and 230d are spaced apart from one another, and a gap between the adjacent two pixel electrodes may be regarded as a field distortion means such as a slit. For example, an outer portion of an upper side of the fourth pixel electrode 230d near the first gate line 210a may function as a first pixel slit 232a and an outer portion of a lower side of the fourth pixel electrode 230d near the second gate line 210b may function as a second pixel slit 232b.

In FIGS. 10 and 11, a second substrate 245 of the LCD device 200 includes the first, second, third and fourth sub pixels SP1, SP2, SP3 and SP4. A black matrix 250 corresponding to the first and second gate lines 210a and 210b, the first and second data lines 220a and 220b, and the first to fourth TFTs T1 to T4 of the first substrate 205 is formed on an inner surface of the second substrate 245. A color filter layer including first, second and third color filters 260a, 260b and 260c is formed on the black matrix 250. The first, second and third color filters 260a, 260b and 260c are formed on the inner surface of the second substrate 245 in the first, second and third sub pixels SP1, SP2 and SP3, respectively. Since the fourth sub pixel SP4 is used as a viewing angle-adjusting sub pixel, display of a color image is not required in the fourth sub pixel SP4. In addition, since transmittance increases by omission of the color filter layer, the color filter layer is not formed in the fourth sub pixel SP4. In another embodiment, however, the color filter layer of a transparent material (i.e., a transparent layer) may be formed in the fourth sub pixel SP4 to improve uniformity of cell gap of the LCD device and planarization property of the color filter layer.

A common electrode 270 is formed on the first, second and third color filter layer 260a, 260b and 260c and the second substrate in the fourth sub pixel SP4. First, second, third and fourth common protrusions 280a, 280b, 280c and 280d of a dielectric material are formed on the common electrode 270 in the first, second, third and fourth sub pixels SP1, SP2, SP3 and SP4, respectively. The first, second, third and fourth common protrusions 280a, 280b, 280c and 280d are used as a field distortion means. The first, second and third protrusions 280a, 280b and 280c each having a hemispheric shape are formed in a central portion of the first, second and third sub pixels SP1, SP2 and SP3, respectively. In addition, the fourth common protrusion 280d having a bar shape along a horizontal direction parallel to the gate line is formed in a central portion of the fourth sub pixel SP4.

The first and second substrates 205 and 245 are attached such that the fourth pixel electrode 230d faces the common electrode 270, and a liquid crystal layer 290 including negative type liquid crystal molecules having a negative dielectric constant anisotropy is formed between the first and second substrates 205 and 245. Although not shown in FIGS. 9, 10 and 11, first and second polarizing plates may be formed on outer surfaces of the first and second substrates 205 and 245, respectively, and a polarization axis of the first polarizing plate may be perpendicular to a polarization axis of the second polarizing plate. For example, the first polarizing plate on the outer surface of the first substrate 205 may have a polarization axis along a horizontal direction parallel to the gate line and the second polarization plate on the outer surface of the second substrate 245 may have a polarization axis along a vertical direction parallel to the data line.

When the gate signal is sequentially applied to the first and second gate lines 210a and 210b, the first, second, third and fourth TFTs T1, T2, T3 and T4 are turned on and the first, second, third and fourth data signals are applied to the first, second, third and fourth pixel electrodes 230a, 230b, 230c and 230d, respectively, through the first and second data lines 220a and 220b. The liquid crystal molecules in the liquid crystal layer 290 are re-aligned by the electric field generated between each of the first, second, third and fourth pixel electrodes 230a, 230b, 230c and 230d and the common electrode 270. The electric field is distorted by the first, second, third and fourth common protrusions 280a, 280b, 280c and 280d and the pixel slits. Accordingly, the liquid crystal molecules are re-aligned to have a fan shape with each of the first, second and third common protrusions 280a, 280b and 280c as a center in each of the first, second and third sub pixels SP1, SP2 and SP3 and a multi-domain is formed in each of the first, second and third sub pixels SP1, SP2 and SP3. In addition, the liquid crystal molecules are re-aligned to have a symmetric shape with respect to the fourth common protrusion 280d and a two-domain is formed in the fourth sub pixel SP4. As a result, the first, second and third sub pixels SP1, SP2 and SP3 display the first image of a wide viewing angle, and the fourth sub pixel SP4 displays the second image that has a low transmittance (black) along the front viewing angle range and a high transmittance along the predetermined right-left viewing angle range.

Figure 12:
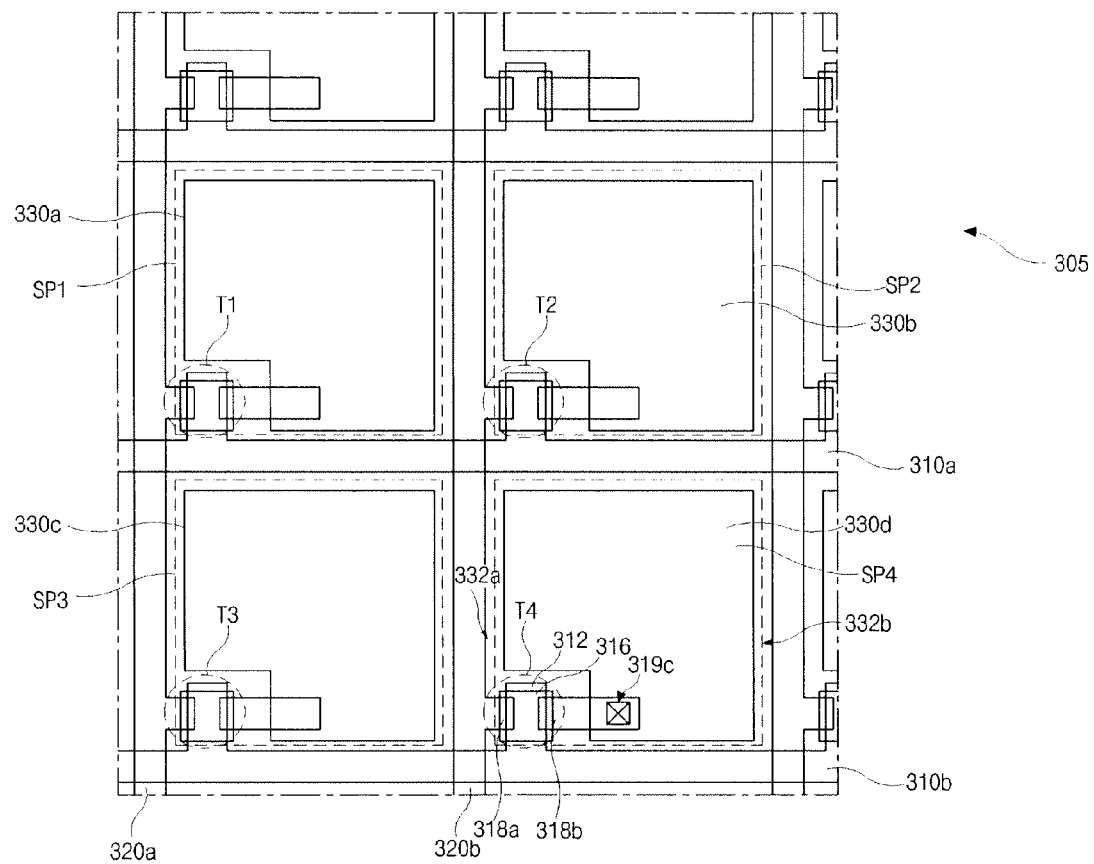
FIGS. 12 and 13 are plan views showing an array substrate and a color filter substrate, respectively, of a liquid crystal display device according to a fourth embodiment of the present invention.
Figure 13:
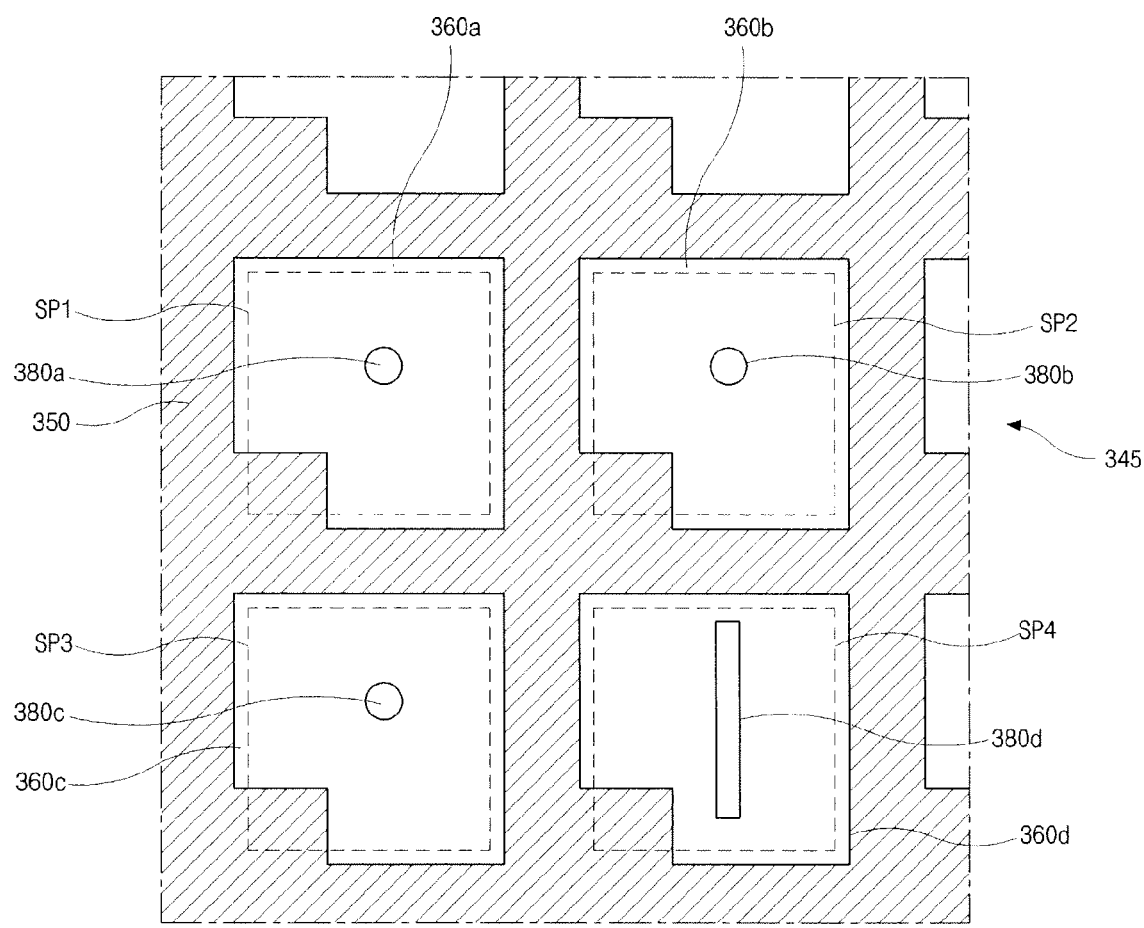

The field distortion means of the fourth sub pixel SP4 such as a slit and a protrusion may have various shapes in another embodiment. FIGS. 12 and 13 are plan views showing an array substrate and a color filter substrate, respectively, of a liquid crystal display device according to a fourth embodiment of the present invention. Since first, second and third sub pixel of the LCD device according to the fourth embodiment are the same as those of the LCD device according to the third embodiment, illustrations will be omitted.

In FIGS. 12 and 13, first, second, third and fourth pixel electrodes 330a, 330b, 330c and 330d are spaced apart from one another, and a gap between the adjacent two pixel electrodes may be regarded as a field distortion means such as a slit. For example, an outer portion of a left side of the fourth pixel electrode 330d near a first gate line 310a may function as a first pixel slit 332a and an outer portion of a right side of the fourth pixel electrode 330d near a second gate line 310b may function as a second pixel slit 332b. In addition, first, second, third and fourth common protrusions 380a, 380b, 380c and 380d of a dielectric material as a field distortion means are formed on a common electrode 370 in first, second, third and fourth sub pixels SP1, SP2, SP3 and SP4, respectively. The first, second and third common protrusions 380a, 380b and 380c each having a hemispheric shape are formed in a central portion of the first, second and third sub pixels SP1, SP2 and SP3, respectively. The fourth common protrusion 380d having a bar shape along a vertical direction parallel to the data line is formed in a central portion of the fourth sub pixel SP4.

The operation of the LCD device according to the fourth embodiment is similar to the operation of the LCD device according to the third embodiment. The liquid crystal molecules are re-aligned by the electric field generated between each of the first, second, third and fourth pixel electrodes 330a, 330b, 330c and 330d and the common electrode 370. The electric field is distorted by the first, second, third and fourth common protrusions 380a, 380b, 380c and 380d and the pixel slits. Accordingly, the liquid crystal molecules are re-aligned to have a fan shape with each of the first, second and third common protrusions 380a, 380b and 380c as a center in each of the first, second and third sub pixels SP1, SP2 and SP3 and a multi-domain is formed in each of the first, second and third sub pixels SP1, SP2 and SP3. In addition, the liquid crystal molecules are re-aligned to have a symmetric shape with respect to the fourth common protrusion 380d and a two-domain is formed in the fourth sub pixel SP4. As a result, the first, second and third sub pixels SP1, SP2 and SP3 display the first image of a wide viewing angle, and the fourth sub pixel SP4 displays the second image that has a low transmittance (black) along the front viewing angle range and a high transmittance along the predetermined up-down viewing angle range.

Consequently, the LCD device having the fourth common protrusion of a vertical bar shape according to the fourth embodiment is switched between the wide viewing angle mode and the narrow viewing angle mode to control the up-down viewing angle, while the LCD device having the fourth common protrusion of a horizontal bar shape according to the third embodiment is switched between the wide viewing angle mode and the narrow viewing angle mode to control the right-left viewing angle.

Although the field distortion means of a horizontal bar shape or a vertical bar shape is formed in each of the fourth sub pixels SP4 of the LCD device according to each of the third and fourth embodiments, the field distortion means of a horizontal bar shape and a vertical bar shape may be alternately formed in each of the fourth sub pixels SP4 of the LCD device according to another embodiment. The ratio of the horizontal bar shape to the vertical bar shape, for example, 1:1, may be determined by user's selection.

Further, although the first, second and third image-displaying sub pixels SP1, SP2 and SP3 and the fourth viewing angle-adjusting sub pixel SP4 constitute a unit pixel for a color image in each of the third and fourth embodiments, five sub pixels, for example, first, second, third and fourth image-displaying sub pixels for red, green, blue and white and a fifth viewing angle-adjusting sub pixel may constitute a unit pixel in another embodiment. The area ratio of the four image-displaying sub pixels and the one viewing angle-adjusting sub pixel may be determined by user's selection. Moreover, the sub pixels may have one of a stripe type where the sub pixels are disposed along one line, a quad type where the sub pixels are disposed in a 2×2 matrix and a pentile type where a fifth sub pixel is disposed at a center of first to fourth sub pixels in a 2×2 matrix.

Figure 14:
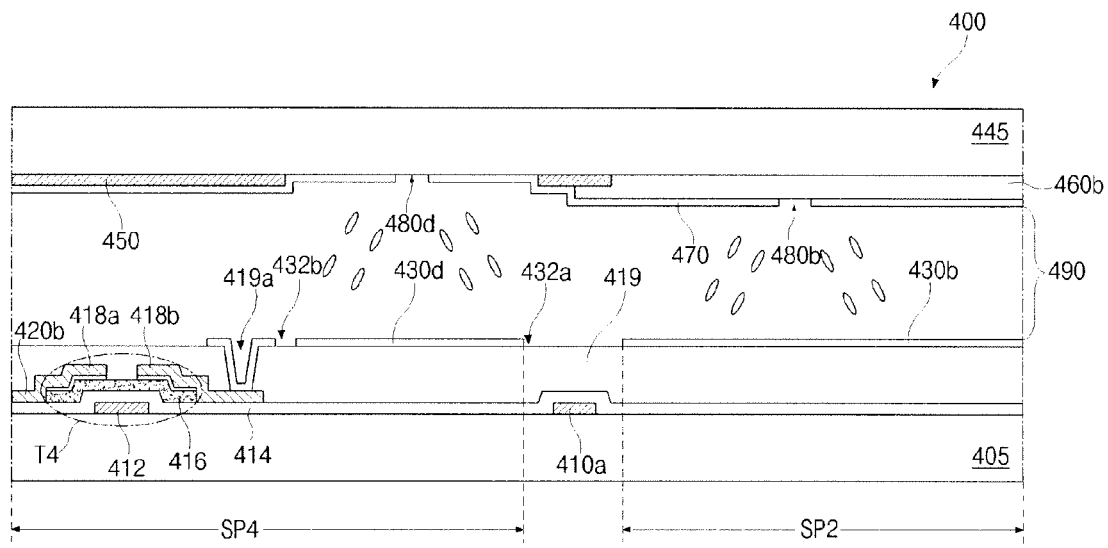
FIG. 14 is a cross-sectional view showing liquid crystal display devices according to a fifth embodiment of the present invention.
Figure 15:
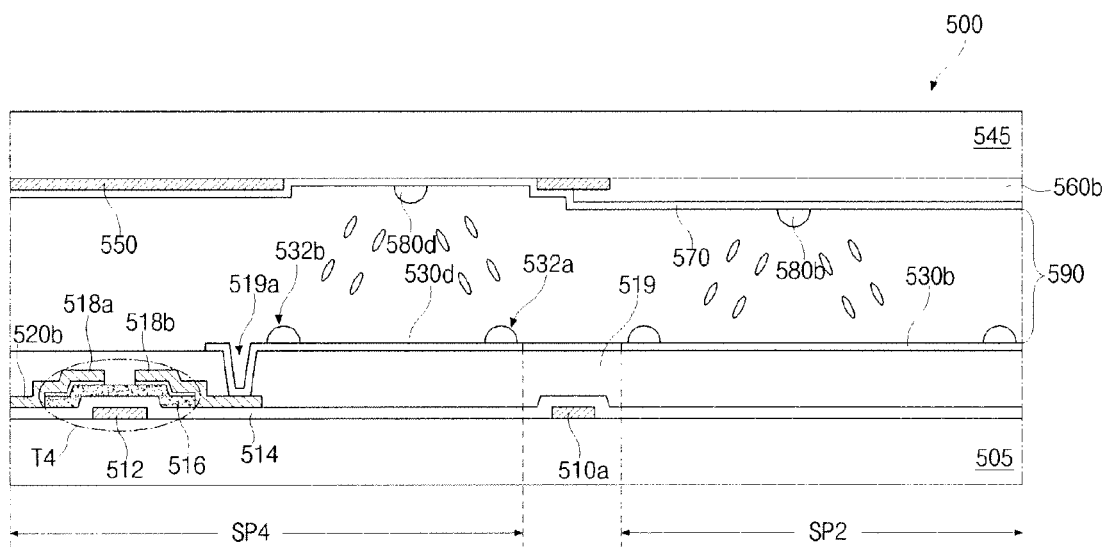
FIG. 15 is a cross-sectional view showing liquid crystal display devices according to a sixth embodiment of the present invention.
Figure 16:
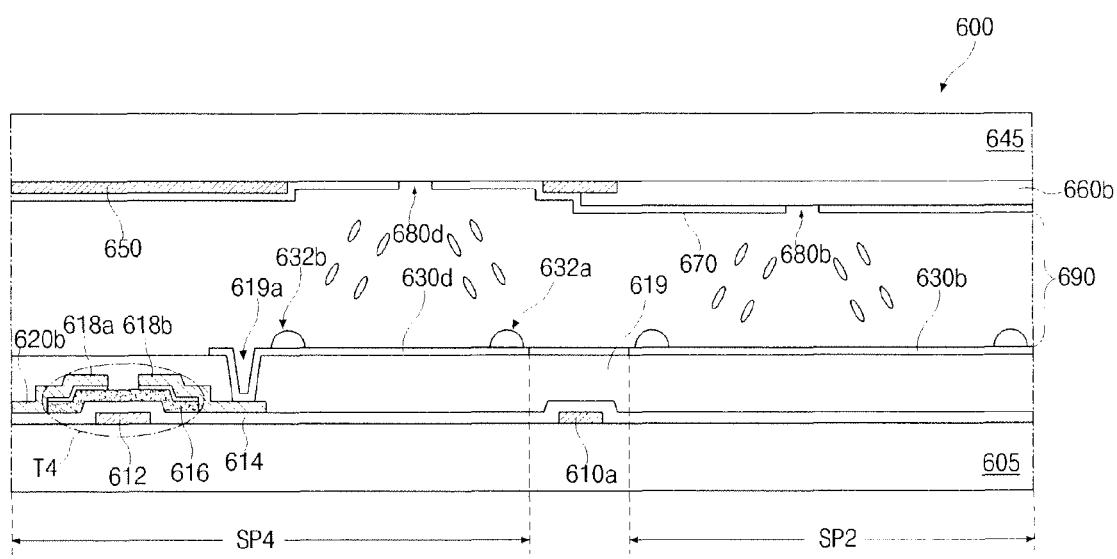
FIG. 16 is a cross-sectional view showing liquid crystal display devices according to a seventh embodiment of the present invention.

FIGS. 14, 15 and 16 are cross-sectional views showing liquid crystal display devices according to fifth, sixth and seventh embodiments of the present invention, respectively.

In FIG. 14, an LCD device 400 includes first and second substrates 405 and 445 and a liquid crystal layer 490 between the first and second substrates 405 and 445. First, second, third and fourth pixel electrodes (not shown, 430b, not shown, 430d) are formed over an inner surface of the first substrate 405 in first, second, third and fourth sub pixels SP1, SP2, SP3 and SP4, respectively, and common electrode 470 is formed over an inner surface of the second substrate 445. The first, second, third and fourth pixel electrodes (not shown, 430b, not shown and 430d) are spaced apart from one another, and a gap between the adjacent two pixel electrodes may be regarded as a field distortion means such as a slit. For example, an outer portion of an upper side of the fourth pixel electrode 430d near a first gate line 410a may function as a first pixel slit 432a and an outer portion of a lower side of the fourth pixel electrode 430d near a second gate line (not shown) may function as a second pixel slit 432b. In addition, first, second, third and fourth common slits (not shown, 480b, not shown and 480d) as a field distortion means are formed in the common electrode 470 in first, second, third and fourth sub pixels SP1, SP2, SP3 and SP4, respectively. The first, second and third common slits (not shown, 480b and not shown) each having a circular shape are formed in a central portion of the first, second and third sub pixels SP1, SP2 and SP3, respectively. The fourth common slit 480d having a bar shape along a horizontal direction parallel to the gate line is formed in a central portion of the fourth sub pixel SP4.

The liquid crystal molecules in the liquid crystal layer 490 are re-aligned by the electric field generated between each of the first, second, third and fourth pixel electrodes (not shown, 430b, not shown and 430d) and the common electrode 470. The electric field is distorted by the first, second, third and fourth common slits (not shown, 480b, not shown and 480d) and the pixel slits. Accordingly, the liquid crystal molecules are re-aligned to have a fan shape with each of the first, second and third common slits (not shown, 480b and not shown) as a center in each of the first, second and third sub pixels SP1, SP2 and SP3 and a multi-domain is formed in each of the first, second and third sub pixels SP1, SP2 and SP3. In addition, the liquid crystal molecules are re-aligned to have a symmetric shape with respect to the fourth common slit 480d and a two-domain is formed in the fourth sub pixel SP4. As a result, the first, second and third sub pixels SP1, SP2 and SP3 display the first image of a wide viewing angle, and the fourth sub pixel SP4 displays the second image that has a low transmittance (black) along the front viewing angle range and a high transmittance along the predetermined up-down viewing angle range.

In FIG. 15, an LCD device 500 includes first and second substrates 505 and 545 and a liquid crystal layer 590 between the first and second substrates 505 and 545. First, second, third and fourth pixel electrodes (not shown, 530b, not shown, 530d) are formed over an inner surface of the first substrate 505 in first, second, third and fourth sub pixels SP1, SP2, SP3 and SP4, respectively, and common electrode 570 is formed over an inner surface of the second substrate 545. Pixel protrusions of a dielectric material as a field distortion means are formed on the first, second, third and fourth pixel electrodes (not shown, 530b, not shown and 530d. For example, a first pixel protrusion 532a is formed on an upper side of the fourth pixel electrode 530d near a first gate line 510a and a second pixel protrusion 532b is formed on a lower side of the fourth pixel electrode 530d near a second gate line (not shown). In addition, first, second, third and fourth common protrusions (not shown, 580b, not shown and 580d) as a field distortion means are formed on the common electrode 570 in first, second, third and fourth sub pixels SP1, SP2, SP3 and SP4, respectively. The first, second and third common protrusions (not shown, 580b and not shown) each having a circular shape are formed in a central portion of the first, second and third sub pixels SP1, SP2 and SP3, respectively. The fourth common protrusion 580d having a bar shape along a horizontal direction parallel to the gate line is formed in a central portion of the fourth sub pixel SP4.

The liquid crystal molecules in the liquid crystal layer 590 are re-aligned by the electric field generated between each of the first, second, third and fourth pixel electrodes (not shown, 530b, not shown and 530d) and the common electrode 570. The electric field is distorted by the first, second, third and fourth common protrusions (not shown, 580b, not shown and 580d) and the pixel protrusions. Accordingly, the liquid crystal molecules are re-aligned to have a fan shape with each of the first, second and third common protrusions (not shown, 580b and not shown) as a center in each of the first, second and third sub pixels SP1, SP2 and SP3 and a multi-domain is formed in each of the first, second and third sub pixels SP1, SP2 and SP3. In addition, the liquid crystal molecules are re-aligned to have a symmetric shape with respect to the fourth common protrusion 580d and a two-domain is formed in the fourth sub pixel SP4. As a result, the first, second and third sub pixels SP1, SP2 and SP3 display the first image of a wide viewing angle, and the fourth sub pixel SP4 displays the second image that has a low transmittance (black) along the front viewing angle range and a high transmittance along the predetermined up-down viewing angle range.

In FIG. 16, an LCD device 600 includes first and second substrates 605 and 645 and a liquid crystal layer 690 between the first and second substrates 605 and 645. First, second, third and fourth pixel electrodes (not shown, 630b, not shown, 630d) are formed over an inner surface of the first substrate 605 in first, second, third and fourth sub pixels SP1, SP2, SP3 and SP4, respectively, and common electrode 670 is formed over an inner surface of the second substrate 645. Pixel protrusions of a dielectric material as a field distortion means are formed on the first, second, third and fourth pixel electrodes (not shown, 630b, not shown and 630d. For example, a first pixel protrusion 632a is formed on an upper side of the fourth pixel electrode 630d near a first gate line 610a and a second pixel protrusion 532b is formed on a lower side of the fourth pixel electrode 630d near a second gate line (not shown). In addition, first, second, third and fourth common slits (not shown, 680b, not shown and 680d) as a field distortion means are formed in the common electrode 670 in first, second, third and fourth sub pixels SP1, SP2, SP3 and SP4, respectively. The first, second and third common slits (not shown, 680b and not shown) each having a circular shape are formed in a central portion of the first, second and third sub pixels SP1, SP2 and SP3, respectively. The fourth common slit 680d having a bar shape along a horizontal direction parallel to the gate line is formed in a central portion of the fourth sub pixel SP4.

The liquid crystal molecules in the liquid crystal layer 690 are re-aligned by the electric field generated between each of the first, second, third and fourth pixel electrodes (not shown, 630b, not shown and 630d) and the common electrode 670. The electric field is distorted by the first, second, third and fourth common slits (not shown, 680b, not shown and 680d) and the pixel protrusions. Accordingly, the liquid crystal molecules are re-aligned to have a fan shape with each of the first, second and third common slits (not shown, 580b and not shown) as a center in each of the first, second and third sub pixels SP1, SP2 and SP3 and a multi-domain is formed in each of the first, second and third sub pixels SP1, SP2 and SP3. In addition, the liquid crystal molecules are re-aligned to have a symmetric shape with respect to the fourth common slit 680d and a two-domain is formed in the fourth sub pixel SP4. As a result, the first, second and third sub pixels SP1, SP2 and SP3 display the first image of a wide viewing angle, and the fourth sub pixel SP4 displays the second image that has a low transmittance (black) along the front viewing angle range and a high transmittance along the predetermined up-down viewing angle range.

Although a single common slit of a circular shape or a single common protrusion of a hemispheric shape is formed in a central portion of each of the first, second and third image-displaying sub pixels SP1, SP2 and SP3 in the LCD device according to one of the third to seventh embodiment, at least two common slit or at least two common protrusion of one of a circular shape and a polygonal shape may be formed in each of the first, second and third image-displaying sub pixels SP1, SP2 and SP3 in the LCD device according to another embodiment.

Further, a pixel slit, a pixel protrusion, a common slit or a common protrusion of a slanted bar shape having an angle of about 20° to about 70° (preferably an angle of about 40° to about 50°, and specifically, an angle of about 45°) with respect to a horizontal direction parallel to the gate line may be formed in each of first, second and third sub pixels SP1, SP2 and SP3 as a field distortion means in an LCD device according to another embodiment. Moreover, a pixel slit, a pixel protrusion, a common slit or a common protrusion of a zigzag bar shape having angles of about 20° to about 70° and of about 110° to about 160° (preferably angles of about 40° to about 50° and of about 130° to about 140°, and specifically, angles of about 45° and of about 135°) with respect to a horizontal direction parallel to the gate line may be formed in each of first, second and third sub pixels SP1, SP2 and SP3 as a field distortion means in an LCD device according to another embodiment.

In addition, a pixel slit, a pixel protrusion, a common slit or a common protrusion of an X shape, a Y shape or a modified Y shape may be formed in each of first, second and third sub pixels SP1, SP2 and SP3 as a field distortion means in an LCD device according to another embodiment. When a pixel slit, a pixel protrusion, a common slit or a common protrusion of a slanted bar shape, a zigzag shape, an X shape, a Y shape or a modified Y shape is used, the pixel slit or the pixel protrusion over the first substrate may have a shape corresponding to and alternate with the common slit or the common protrusion over the second substrate.

It will be apparent to those skilled in the art that various modifications and variations can be made in a liquid crystal display device and a method of driving the liquid crystal display device of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
    forming a gate line and a data line on a first substrate, the gate line and the data line crossing each other to define an image-displaying sub pixel and a viewing angle-adjusting sub pixel;
    forming a thin film transistor connected to the gate line and the data line;
    forming a pixel electrode connected to the thin film transistor, the pixel electrode disposed in an entire area of each of the image-displaying sub pixel and the viewing angle-adjusting sub pixel on an inner surface of the first substrate;
    forming a color filter layer in the image-displaying sub pixel on a second substrate;
    forming a common electrode on the color filter layer, the common electrode disposed on an entire inner surface of the second substrate;
    forming a first field distortion means in the image-displaying sub pixel, the first field distortion means disposed on the common electrode;
    forming a second field distortion means in the viewing angle-adjusting sub pixel, the second field distortion means disposed on each of the pixel electrode and the common electrode;
    attaching the first and second substrates such that the pixel electrode and the common electrode face each other; and
    forming a liquid crystal layer having a negative dielectric constant anisotropy between the first and second substrates,
    wherein the first field distortion means includes at least one of a common protrusion of a dielectric material on the common electrode and a common slit in the common electrode, and the second field distortion means includes at least one of a pixel protrusion of a dielectric material on the pixel electrode and, a pixel slit in the pixel electrode and at least one of, a common protrusion of a dielectric material on the common electrode and a common slit in the common electrode.

2. The method according to claim 1, wherein the image-displaying sub pixel has a property graph of a transmittance to a viewing angle where the transmittance has a maximum value at the viewing angle of about 0° and decreases with increase of the viewing angle.

3. The method according to claim 1, wherein the viewing angle-adjusting sub pixel has a property graph of a transmittance to a viewing angle where the transmittance has a minimum value at the viewing angle of about 0° and maximum values at first and second viewing angles that are substantially symmetrical to each other with respect to the viewing angle of about 0°.

4. The method according to claim 1, wherein the first field distortion means includes at least one of a common protrusion of a dielectric material on the common electrode and a common slit in the common electrode, and second field distortion means includes at least one of a pixel protrusion of a dielectric material on the pixel electrode and, a pixel slit in the pixel electrode and at least one of, a common protrusion of a dielectric material on the common electrode and a common slit in the common electrode.

5. The method according to claim 1, wherein the first field distortion means includes at least one having one of a circular shape and a polygonal shape to form a multi-domain in the image-displaying sub pixel.

6. The method according to claim 1, wherein the second field distortion means includes at least one having one of a horizontal bar shape and a vertical bar shape to form a two-domain in the viewing angle-adjusting sub pixel.

7. The method according to claim 1, further comprising forming first and second polarizing plates on outer surface of the first and second substrates, respectively, wherein a polarization axis of the first polarizing plate is perpendicular to a polarization axis of the second polarizing plate.

8. A method of driving a liquid crystal display device including: first and second substrates facing and spaced apart from each other, each of the first and second substrates having an image-displaying sub pixel and a viewing angle-adjusting sub pixel; a thin film transistor corresponding to each of the image-displaying sub pixel and the viewing angle-adjusting sub pixel; a liquid crystal display layer between the first and second substrates, the liquid crystal layer having a negative dielectric constant anisotropy; a pixel electrode in an entire area of each of the image-displaying sub pixel and the viewing angle-adjusting sub pixel on an inner surface of the first substrate; a common electrode on an entire inner surface of the second substrate; a first field distortion means in the image-displaying sub pixel, the first field distortion means formed on the common electrode; and a second field distortion means in the viewing angle-adjusting sub pixel, the second field distortion means formed on each of the pixel electrode and the common electrode, comprising:

when the liquid crystal display device is operated in a wide viewing angle mode, displaying a first image of a wide viewing angle by the image-displaying sub pixel; and displaying a black at an entire viewing angle range by the viewing angle-adjusting sub pixel, when the liquid crystal display device is operated in a narrow viewing angle mode, displaying the first image of the wide viewing angle by the image-displaying sub pixel; and displaying the black within a front viewing angle range and a second image within a predetermined viewing angle range by the viewing angle-adjusting sub pixel.

9. The method according to claim 8, wherein the image-displaying sub pixel has a property graph of a transmittance to a viewing angle where the transmittance has a maximum value at the viewing angle of about 0° and decreases with increase of the viewing angle.

10. The method according to claim 8, wherein the viewing angle-adjusting sub pixel has a property graph of a transmittance to a viewing angle where the transmittance has a minimum value at the viewing angle of about 0° and maximum values at first and second viewing angles that are substantially symmetrical to each other with respect to the viewing angle of about 0°.

11. The method according to claim 8, wherein the second image is one of a white and a text.

* * * * *